(12) United States Patent
Murase

(10) Patent No.: US 11,345,347 B2
(45) Date of Patent: May 31, 2022

(54) BRAKE CONTROL DEVICE FOR VEHICLE

(71) Applicant: TOYOTA JIDOSHA KABUSHIKI KAISHA, Toyota (JP)

(72) Inventor: Junichi Murase, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 16/653,293

(22) Filed: Oct. 15, 2019

(65) Prior Publication Data
US 2020/0122728 A1 Apr. 23, 2020

(30) Foreign Application Priority Data
Oct. 17, 2018 (JP) .............................. JP2018-196152

(51) Int. Cl.
B60W 30/18 (2012.01)
B60W 10/188 (2012.01)
B60W 20/14 (2016.01)
B60L 7/26 (2006.01)

(52) U.S. Cl.
CPC ......... *B60W 30/18127* (2013.01); *B60L 7/26* (2013.01); *B60W 10/188* (2013.01); *B60W 20/14* (2016.01); *B60W 2510/184* (2013.01)

(58) Field of Classification Search
None
See application file for complete search history.

(56) References Cited

U.S. PATENT DOCUMENTS

| | | | |
|---|---|---|---|
| 9,718,459 B2 * | 8/2017 | Imamura | B60W 30/18127 |
| 10,392,018 B1 * | 8/2019 | Rhodes | B60H 1/3208 |
| 2010/0256849 A1 * | 10/2010 | Akimoto | F01N 3/101 701/22 |
| 2016/0059843 A1 * | 3/2016 | Oguma | B60W 10/06 701/22 |
| 2016/0137068 A1 * | 5/2016 | Nada | B60L 7/14 701/70 |
| 2016/0257297 A1 * | 9/2016 | Oshiumi | B60L 15/20 |
| 2016/0325637 A1 * | 11/2016 | Payne | B60L 58/24 |

FOREIGN PATENT DOCUMENTS

| | | |
|---|---|---|
| JP | 6-113404 A | 4/1994 |
| JP | 2007-253715 A | 10/2007 |
| JP | 2015-74346 A | 4/2015 |

* cited by examiner

*Primary Examiner* — Todd Melton
*Assistant Examiner* — Jason R Roberson
(74) *Attorney, Agent, or Firm* — Sughrue Mion, PLLC

(57) ABSTRACT

A brake control device for a vehicle includes: a motor connected to wheels; a hydraulic brake that generates a friction braking force based on frictional contact with a brake rotor that integrally rotates with the wheels; a controller that performs coordination control of regenerative brake control, in which a regenerative power generation is performed by the motor on a basis of rotation of the wheels to apply a regenerative braking force to the wheels, and hydraulic brake control, in which the hydraulic brake is operated; and a battery that exchanges power with the motor. Further, in a case where a temperature of the brake rotor is higher than a predetermined temperature when input to the battery is restricted in a state where there is a deceleration request, the controller reduces the friction braking force, and performs the regenerative brake control while power is consumed by an electric device.

5 Claims, 6 Drawing Sheets

BRAKE CONTROL DEVICE FOR VEHICLE

CROSS-REFERENCE TO RELATED APPLICATION(S)

The present application claims priority to and incorporates by reference the entire contents of Japanese Patent Application No. 2018-196152 filed in Japan on Oct. 17, 2018.

BACKGROUND

The present disclosure relates to a brake control device for a vehicle.

In Japanese Laid-open Patent Publication No. H06-113404, there is disclosed a case where, when a hydraulic brake and a regenerative brake are used in combination, the regenerative brake can be used even if a battery is fully charged by a cooling fan being driven using a part of regenerative power obtained by the regenerative brake.

SUMMARY

There is a need for providing a brake control device for a vehicle capable of increasing opportunities to use a regenerative brake while securing a braking force necessary for a deceleration request.

According to an embodiment, a brake control device for a vehicle includes: a motor connected to wheels; a hydraulic brake that generates a friction braking force based on frictional contact with a brake rotor that integrally rotates with the wheels; a controller that performs coordination control of regenerative brake control, in which a regenerative power generation is performed by the motor on a basis of rotation of the wheels to apply a regenerative braking force to the wheels, and hydraulic brake control, in which the hydraulic brake is operated; and a battery that exchanges power with the motor. Further, in a case where a temperature of the brake rotor is higher than a predetermined temperature when input to the battery is restricted in a state where there is a deceleration request, the controller reduces the friction braking force, and performs the regenerative brake control while power is consumed by an electric device.

DETAILED DESCRIPTION OF THE PREFERRED EMBODIMENTS

In the configuration disclosed in Japanese Laid-open Patent Publication No. H06-113404, an amount of cooling of the cooling fan is determined on the basis of an amount of depressing of a brake pedal and the voltage of the battery, and a change in friction braking force due to a change in temperature of a brake rotor is not taken into consideration. In addition, when deceleration requests continue for a long time, power may be excessively consumed by the cooling fan, which may deteriorate the electric mileage.

Hereinafter, a brake control device for a vehicle according to embodiments of the present disclosure will be described in detail with reference to the accompanying drawings. Note that the present disclosure is not limited to the embodiments described below.

First Embodiment

Figure 1:
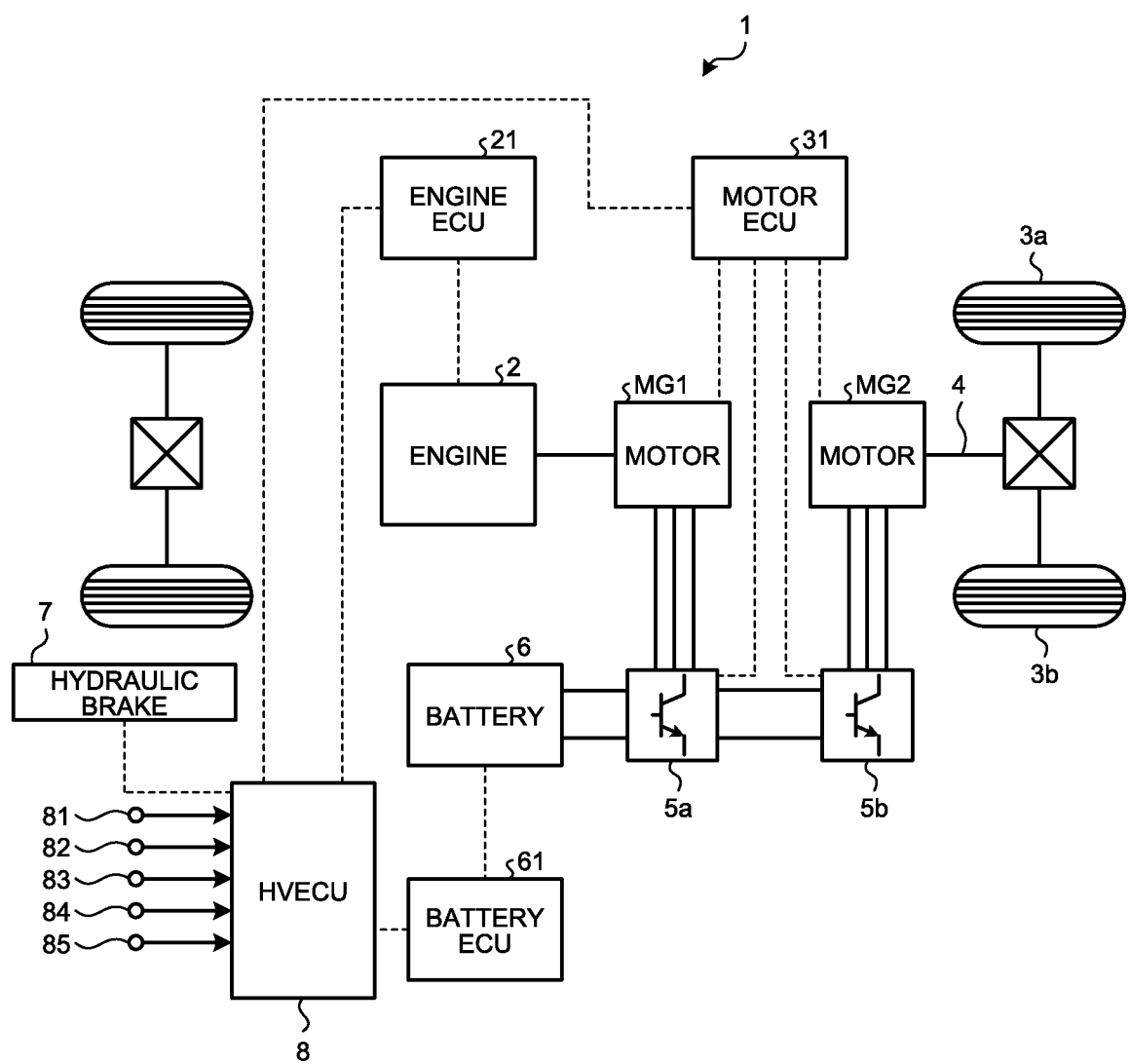
FIG. 1 is a schematic view illustrating a configuration of a vehicle to which a brake control device according to a first embodiment is applied.

FIG. 1 is a schematic view illustrating an example configuration of a vehicle to which a brake control device according to a first embodiment is applied. As illustrated in FIG. 1, a vehicle 1 is composed of what is called a series hybrid automobile in which a motor for power generation (power generation motor) MG1 is connected to an output shaft of an engine 2 and a motor for traveling (drive motor) MG2 is connected to a drive shaft 4 coupled to drive wheels 3a and 3b. The vehicle 1 includes the engine 2, the power generation motor MG1, the drive motor MG2, inverters 5a and 5b, a battery 6, a hydraulic brake 7, and a hybrid vehicle electronic control unit (hereinafter simplified as an "HVECU") 8.

The engine 2 is composed of an internal combustion engine, and the operation thereof is controlled by an engine electronic control unit (hereinafter referred to as an "engine ECU") 21. The engine ECU 21 includes a microprocessor, which includes a central processing unit ("CPU"), a read-only memory ("ROM") for storing a control program, a random access memory ("RAM") for temporarily storing data, an input/output port, a communication port and the like. The engine ECU 21 is connected to the HVECU 8 via the communication port.

The power generation motor MG1 is composed of a synchronous generator motor, and the rotor thereof is connected to the output shaft of the engine 2. The drive motor MG2 is composed of a synchronous generator motor, and the rotor thereof is connected to the drive shaft 4. The inverters 5a and 5b are connected to the power generation motor MG1 and the drive motor MG2, respectively, and are also connected to the battery 6 via a power line. That is, the power generation motor MG1 and the battery 6 are connected to each other in a manner that power can be exchanged therebetween, and the drive motor MG2 and the battery 6 are connected to each other in manner that power can be exchanged therebetween. The power generation motor MG1 and the drive motor MG2 are rotationally driven by a plurality of switching elements included in the inverters 5a and 5b being subject to switching control performed by a motor electronic control unit (hereinafter referred to as a "motor ECU") 31. The motor ECU 31 includes a microprocessor similar to that included in the engine ECU 21. The motor ECU 31 is connected to the HVECU 8 via the communication port.

The battery 6 includes a lithium-ion secondary battery or a nickel metal hydride secondary battery, and is connected to the inverters 5a and 5b via power lines. A charge state of the battery 6 is managed by a battery electronic control unit (hereinafter referred to as a "battery ECU") 61. The battery ECU 61 includes a microprocessor similar to that included in the engine ECU 21. The battery ECU 61 is connected to the HVECU 8 via the communication port. The HVECU 8 is capable of calculating a state of charge ("SOC") of the battery 6 on the basis of information obtained through, for example, information communications with the battery ECU 61. The SOC indicates a charge state of the battery 6. Note that the HVECU 8 may obtain information on the basis of signals input from a voltage sensor and a current sensor provided in the battery 6 to calculate the SOC of the battery 6.

The hydraulic brake 7 is a brake device that includes a brake rotor (not illustrated) integrally rotates with wheels, and applies a friction braking force to the brake rotor. The brake rotor is provided not only to the drive wheels 3a and 3b but also to each of four wheels of the vehicle 1. The hydraulic brake 7 includes a hydraulic brake system such as an electric control braking system ("ECB") capable of regenerative coordination. Further, the hydraulic brake 7 controls the magnitude of hydraulic pressure to control the magnitude of the friction braking force generated by frictional contact with the brake rotor. The hydraulic brake 7 operates in accordance with control signals from the HVECU 8 to control the braking operation of the vehicle 1.

The HVECU 8 includes a microprocessor similar to that included in the engine ECU 21. Signals from various sensors are input to the HVECU 8 via input ports. Examples of the signals input to the HVECU 8 include ignition signals from an ignition switch 81, an engine speed signal from an engine speed sensor 82 for detecting rotation speed of the engine 2, an accelerator position signal from an accelerator pedal position sensor 83 for detecting an amount of depressing of an accelerator pedal (amount of accelerator operation), a brake pedal position signal from a brake pedal position sensor 84 for detecting an amount of depressing of an brake pedal (amount of brake operation), and a vehicle speed signal from a vehicle speed sensor 85. The HVECU 8 is connected to the engine ECU 21, the motor ECU 31, and the battery ECU 61 via the communication port.

The HVECU 8 calculates drive force (required drive force) required of the vehicle 1 by a driver on the basis of the amount of acceleration operation detected by the accelerator pedal position sensor 83. Further, the HVECU 8 calculates a braking force (a required braking force) required of the vehicle 1 by the driver on the basis of the amount of brake operation detected by the brake pedal position sensor 84.

Furthermore, at the time of deceleration and braking, the HVECU 8 regeneratively generates, using the drive motor MG2, to convert the kinetic energy of the vehicle 1 into an electric energy, and performs regenerative brake control ("regenerative braking") for regeneratively braking wheels. With the regenerative braking being executed, the drive motor MG2 functions as a generator, and regenerative braking force is applied to the drive wheels 3a and 3b from the drive motor MG2. The power regeneratively generated by the drive motor MG2 can also be stored in the battery 6, and can be supplied to an electric device (not illustrated in FIG. 1) mounted on the vehicle 1. The electric device includes auxiliary equipment such as an air conditioner and a heater. The HVECU 8 is capable of controlling the operation of the electric device. In this case, the HVECU 8 can perform switching control on the inverters 5a and 5b to supply the power generated by the drive motor MG2 on the basis of the regenerative power generation to the electric device without passing through the battery 6. The HVECU 8 can also perform switching control on the inverters 5a and 5b to supply the power of the battery 6 to the electric device so that the electric device can operate by consuming the power of the battery 6.

Furthermore, at the time when the battery 6 is fully charged, in other words, at the time when an input to the battery 6 is restricted (Win limit), the HVECU 8 disables the regenerative braking performed by the drive motor MG2, and braking using the hydraulic brake 7 can be performed. In that case, even if the battery 6 is fully charged, use of the hydraulic brake 7 is restricted in the case where the temperature of the brake rotor included in the hydraulic brake 7 is equal to or higher than a predetermined value, and brake coordination control is performed, in which the regenerative brake based on the drive motor MG2 is used while consuming a power using the electric device. In the vehicle 1 according to the first embodiment, the HVECU 8 performs the brake coordination control so that a rise in temperature of the brake rotor that generates the friction braking force is suppressed. Note that the brake control device according to the first embodiment includes the HVECU 8, the motor ECU 31, and the battery ECU 61.

In the vehicle 1 having such a configuration, the hydraulic brake 7 and the regenerative brake are selectively used by the HVECU 8 while the battery 6 is predicted to be subject to input restriction, thereby suppressing the rise in temperature of the brake rotor. Hereinafter, an operation of the HVECU 8 at the time of performing the brake coordination control will be described. Note that a temperature of the brake rotor may be described as a brake temperature in the descriptions.

Figure 2:
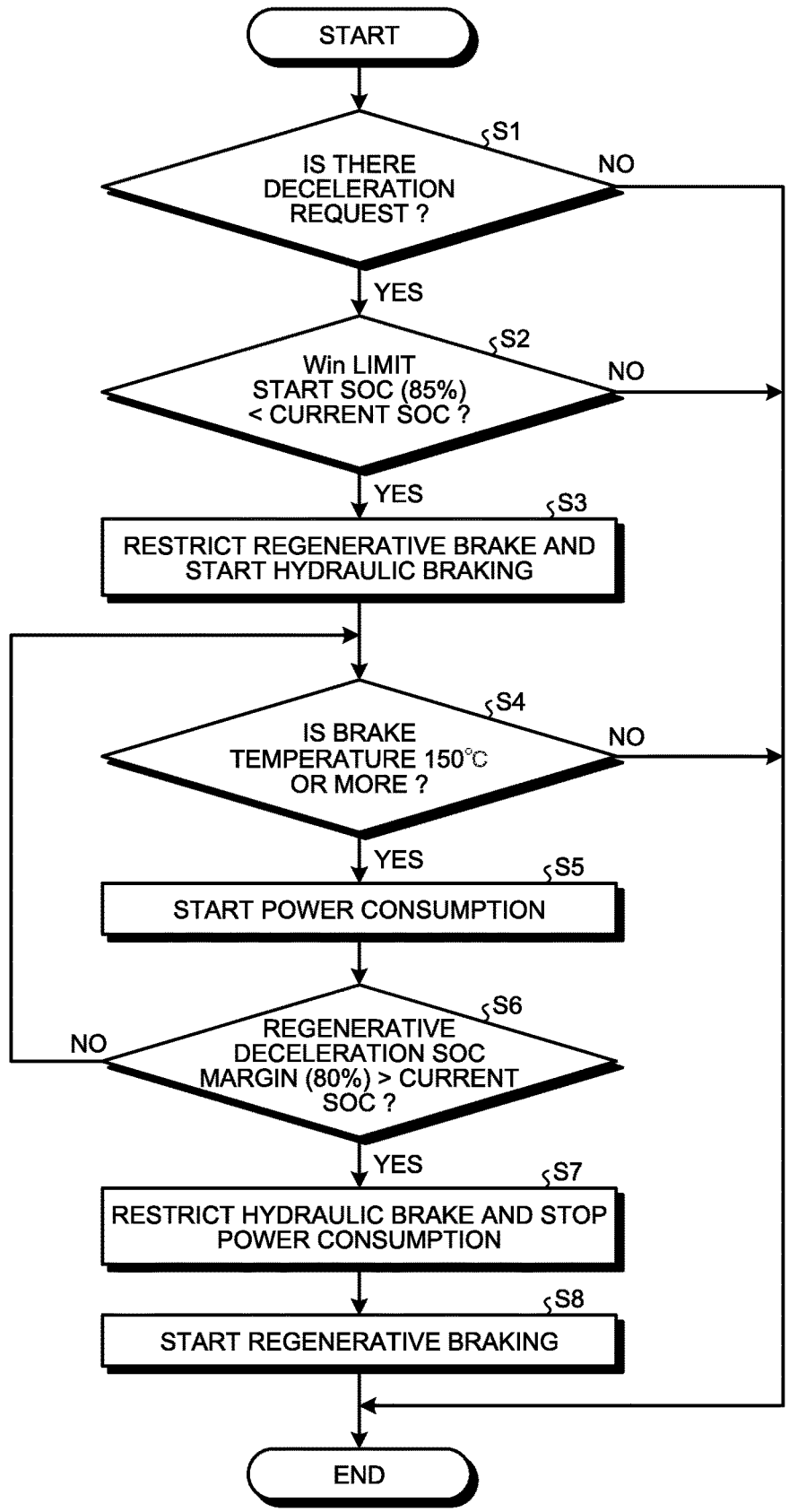
FIG. 2 is a flowchart illustrating a control flow of brake coordination control according to the first embodiment.

FIG. 2 is a flowchart illustrating a control flow of the brake coordination control. The control flow illustrated in FIG. 2 is performed by the HVECU 8. Note that control routine illustrated in FIG. 2 is repeatedly executed while the vehicle 1 is traveling.

First, the HVECU 8 determines whether there is a deceleration request from the driver (step S1). The case where there is a deceleration request indicates a case where the accelerator pedal position sensor 83 detects that depressing of the accelerator pedal has been released or a case where the brake pedal position sensor 84 detects that the brake pedal has been depressed. Examples of such a case include a situation in which, while the vehicle 1 is traveling on a downhill road, the driver requires a predetermined deceleration level while depressing the brake pedal. If there is no deceleration request from the driver (step S1: No), the control routine is terminated.

If there is a deceleration request from the driver (step S1: Yes), the HVECU 8 compares the current SOC with an SOC as an input restriction threshold value for starting the input restriction to the battery 6 ("Win limit start SOC"), and determines whether the current SOC is greater than the Win limit start SOC (step S2). The Win limit start SOC indicates an SOC in a state in which the deceleration level cannot be secured only by the regenerative braking force of the regenerative brake in response to the required deceleration level, which is an SOC in which the regenerative brake is switched to the hydraulic brake 7. For example, the Win limit start SOC is set to 85%. If the determination in step S1 is affirmative, the HVECU 8 starts the regenerative braking to apply the regenerative braking force of the drive motor MG2 to the drive wheels 3a and 3b. If the current SOC is equal to or less than the Win limit start SOC (step S2: No), the control routine is terminated.

If the current SOC is greater than the Win limit start SOC (step S2: Yes), the HVECU 8 restricts the regenerative brake, and starts the hydraulic brake control ("hydraulic braking") (step S3). By the regenerative brake being restricted by the HVECU 8, the magnitude of the regenerative braking force is made less than before the restriction.

Since the HVECU 8 starts the regenerative braking when the determination in step S1 is affirmative, in step S3, the magnitude of the regenerative braking force is controlled to be less than the regenerative braking being executed. In other words, control is performed such that the regenerative power generation of the drive motor MG2 decreases. Moreover, in step S3, the hydraulic braking is started to secure the braking force corresponding to the decrease in regenerative braking force using the friction braking force based on the hydraulic brake 7. Accordingly, the ratio of the friction braking force relative to the required braking force increases. The HVECU 8 performs the brake coordination control such that the braking force necessary for the required braking force is satisfied by the sum of the regenerative braking force and the friction braking force.

Subsequently, the HVECU 8 determines whether the temperature of the brake rotor is equal to or higher than 150° C. (step S4). In step S4, a high temperature determination on the hydraulic brake 7 is performed. The brake temperature of 150° C. is a threshold value set as an upper limit value in a temperature range in which the coefficient of friction of the brake rotor does not change. When the temperature of the brake rotor exceeds 150° C., the coefficient of friction of the brake rotor may decrease, and the magnitude of the friction braking force generated relative to the amount of depressing of the brake pedal may decrease. Further, in step S4, the temperature of the brake rotor is detected by, for example, a temperature sensor provided in the hydraulic brake 7, and determination is made using a value measured by the temperature sensor. Alternatively, the HVECU 8 is also capable of estimating the temperature of the brake rotor on the basis of an outside air temperature or vehicle information to make determination in step S4 using the estimated value. If the temperature of the brake rotor is less than 150° C. (step S4: No), the control routine is terminated.

If the temperature of the brake rotor is equal to or higher than 150° C. (step S4: Yes), the HVECU 8 starts power consumption based on the electric device (step S5). The temperature of 150° C. as a threshold value used in step S4 is a threshold value for starting power consumption. In step S5, the power generated by the regenerative brake is controlled to be consumed by the electric device without being stored in the battery 6. Alternatively, in step S5, control may be performed such that the power stored in the battery 6 is supplied to the electric device and the electric device consumes the power of the battery 6, thereby decreasing the SOC of the battery 6.

Subsequently, the HVECU 8 compares the current SOC with the SOC in the state having a margin capable of performing the regenerative braking ("regenerative deceleration SOC margin"), and determines whether the current SOC is less than the regenerative deceleration SOC margin (step S6). The margin capable of performing the regenerative braking indicates a charge state having spare capacity (margin) capable of storing, in the battery 6, the regenerative power (power generation) generated when the regenerative braking is performed such that the required deceleration level is satisfied by the regenerative braking force with respect to the SOC at which the battery 6 is fully charged (e.g., 90%). For example, the regenerative deceleration SOC margin is set to 80%. If the current SOC is greater than the regenerative deceleration SOC margin (step S6: No), the control routine returns to step S4.

If the current SOC is equal to or less than the regenerative deceleration SOC margin (step S6: Yes), the HVECU 8 restricts the hydraulic brake 7, stops the power consumption of the electric device (step S7), and starts the regenerative braking (step S8). By the hydraulic brake 7 being restricted by the HVECU 8, the magnitude of the generated friction braking force becomes smaller compared to that before the restriction. That is, since the friction braking force is reduced upon execution of step S7, the frictional force applied to the brake rotor decreases, thereby decreasing the temperature of the brake rotor. In addition, the regenerative power generated by the regenerative braking being started to stop the power consumption of the electric device is stored in the battery 6, thereby increasing the SOC of the battery 6. Upon execution of the control in step S8, the control routine is terminated.

Figure 3:
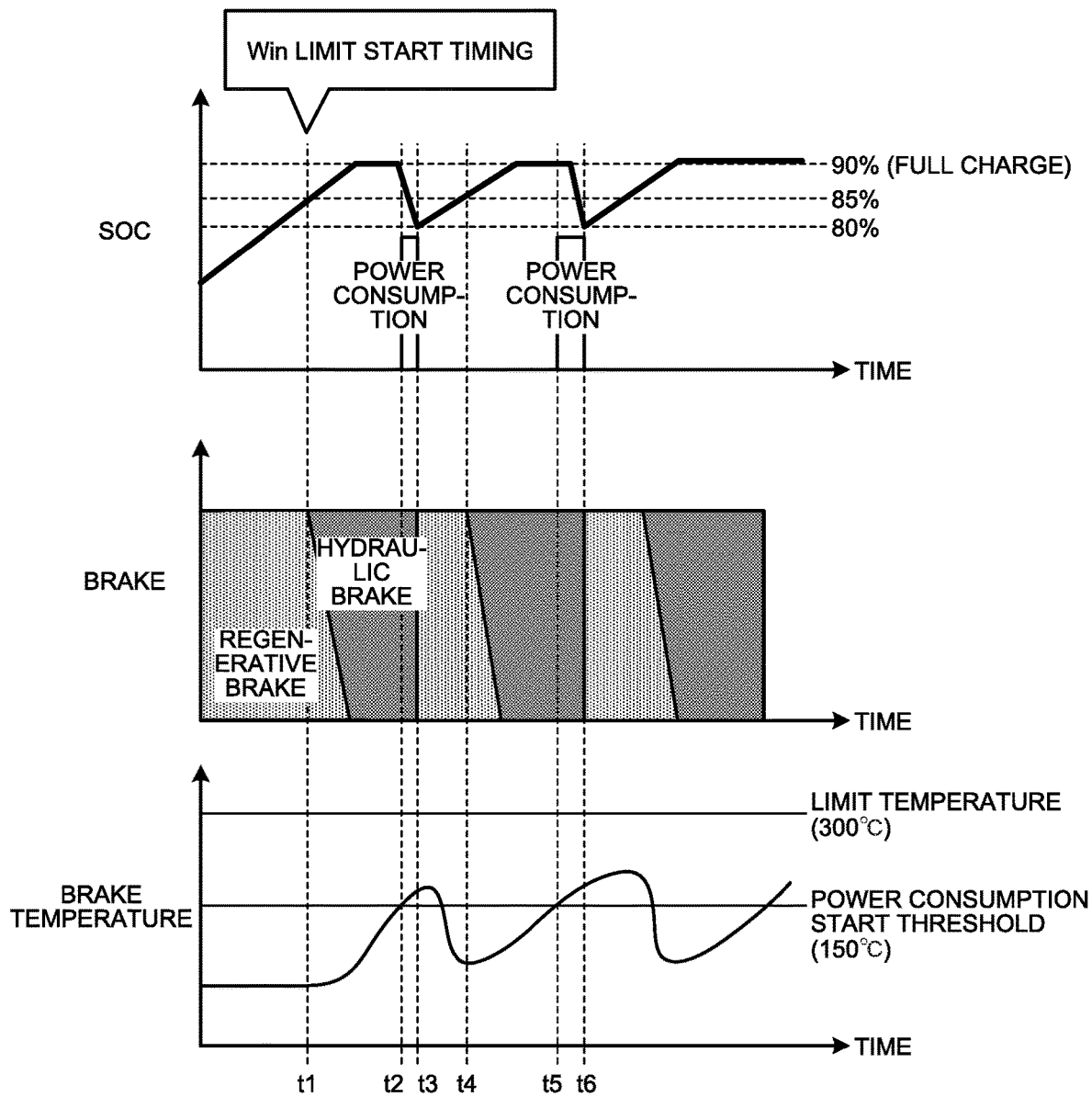
FIG. 3 is a time chart illustrating changes in a vehicle state when the brake coordination control according to the first embodiment is performed.

FIG. 3 is a time chart illustrating changes in a vehicle state when the brake coordination control according to the first embodiment is performed.

First, in the state where the SOC of the battery 6 is less than the regenerative deceleration SOC margin, only the regenerative braking force based on the regenerative brake is generated in response to the deceleration request. Since the hydraulic brake 7 is not operated in this state, the SOC increases due to the regenerative power generation although the temperature of the brake rotor (brake temperature) does not increase. Then, at time t1, the SOC reaches the SOC at which the input restriction of the battery 6 is started (85%). Since the state at time t1 is in the case of affirmative determination in step S2 in FIG. 2 (step S2: Yes), the HVECU 8 restricts the regenerative brake from time t1 and starts the hydraulic braking.

After time t1, concurrent use of the regenerative brake and the hydraulic brake 7 starts, and the regenerative braking force based on the regenerative brake decreases, whereby increment of the SOC becomes moderate. Meanwhile, the friction braking force is generated by the hydraulic brake 7 being started, whereby the brake temperature rises. Subsequently, at time t2, the brake temperature exceeds 150° C. that is the threshold value for starting power consumption. The threshold value for starting power consumption is a threshold value for suppressing a rise in the brake temperature up to a limit temperature (e.g., 300° C.), which is a threshold value for performing power consumption by the electric device. Since the state at time t2 is in the case of affirmative determination in step S4 in FIG. 2 (step S4: Yes), the HVECU 8 starts the power consumption of the electric device while using only the hydraulic brake 7. As a result, after time t2, the SOC decreases.

Subsequently, at time t3, the SOC decreases to 80% that is the regenerative deceleration SOC margin. Since the state at time t3 is in the case of affirmative determination in step S6 in FIG. 2 (step S6: Yes), the HVECU 8 stops the hydraulic brake 7, stops the power consumption of the electric device, and starts the regenerative braking.

After time t3, only the regenerative braking force based on the regenerative brake is generated, whereby the brake temperature decreases and the SOC increases due to the regenerative power generation. Subsequently, at time t4, the SOC having increased due to the regenerative power generation exceeds 85% that is the Win limit start SOC. At time t4, the brake coordination control similar to that at time t1 described above is performed. Thereafter, the state at time t5 is similar to the state at time t2 described above, and the state at time t6 is similar to the state at time t3 described above. In this manner, the HVECU 8 according to the first embodiment performs the brake coordination control for selecting the regenerative brake or the hydraulic brake 7 on the basis of the SOC and the brake temperature, whereby the brake temperature can be prevented from reaching 300° C. that is the limit temperature.

As described above, according to the first embodiment, even if the input restriction to the battery 6 is applied when there is a deceleration request, the power consumption of the electric device can be started according to the change in temperature of the brake rotor, and the power consumption can be stopped according to the change in SOC of the battery 6. Accordingly, even if the temperature of the brake rotor rises when the input to the battery 6 is restricted, the regenerative brake can be used, and the use of the hydraulic brake 7 can be restricted. Therefore, the rise in temperature of the brake rotor can be suppressed.

Second Embodiment

Next, a brake control device according to a second embodiment will be described. In the second embodiment, coordination control of the hydraulic brake 7 and the regenerative brake is performed on the basis of future driving prediction. Note that, in descriptions of the second embodiment, descriptions of configurations similar to those in the first embodiment described above will be omitted, and reference signs thereof are used.

The HVECU 8 according to the second embodiment starts using the hydraulic brake 7 in a state where an SOC has a margin when it is determined that, according to the future driving prediction, the input restriction to the battery 6 is applied and traveling on a route requiring long deceleration is expected. Thereafter, when the temperature of the brake rotor rises, the HVECU 8 performs switching from the hydraulic brake 7 to the regenerative brake in the state where regenerative braking force for securing the required deceleration level ("required braking force") can be generated, whereby the use of the hydraulic brake 7 is stopped and the rise in temperature of the brake rotor is suppressed.

The HVECU 8 is capable of performing, as future driving predictions, route prediction, vehicle load prediction, SOC behavior prediction, and brake temperature rise prediction. Specifically, the HVECU 8 is capable of performing future route prediction on the basis of information obtained by a navigation system or a front camera ("on-board camera"). Map information that can be obtained from the navigation system is information including altitude ("elevation"). The HVECU 8 can predict a change in altitude when traveling along a route predicted from the current position of a vehicle 1. Environmental information that can be obtained from the front camera includes environmental information in front of the vehicle, in other words, in the traveling direction.

Furthermore, the HVECU 8 performs future vehicle load prediction from the map information (altitude), the environmental information (outside air temperature), and the predicted route information. The vehicle load indicates a load (deceleration) generated when the vehicle 1 travels on the predicted route. For example, in a case where it can be predicted to continue traveling on a downhill road on the basis of the route prediction and the altitude of the map information, the deceleration level necessary to continue traveling on the predicted downhill road in a decelerating state is predicted as a vehicle load.

Moreover, the HVECU 8 performs the SOC behavior prediction and the brake temperature rise prediction on the basis of the vehicle load prediction. According to the SOC behavior prediction, in the case where it can be predicted that regenerative braking force is generated on the basis of the vehicle load prediction, an increase in SOC can be predicted according to the distance subject to decelerating traveling based on the regenerative braking force. According to the brake temperature rise prediction, in the case where it can be predicted that the friction braking force is generated on the basis of the vehicle load prediction, a rise in temperature of the brake rotor can be predicted according to the distance subject to decelerating traveling based on the friction braking force. Furthermore, the HVECU 8 is capable of performing the SOC behavior prediction and the brake temperature rise prediction also in the case where brake coordination control in which the regenerative brake and the hydraulic brake 7 are used in combination is performed.

The HVECU 8 according to the second embodiment having a configuration as described above performs control of staring to use the hydraulic brake 7 earlier at a predetermined SOC threshold value (margin SOC threshold value) in a case where, on the basis of various kinds of prediction (driving prediction) described above, it can be predicted that the battery 6 will be fully charged in the future or the temperature of the brake rotor will rise to a high temperature state. The SOC threshold value is an SOC amount in the state having a margin to which no input restriction to the battery 6 is applied even while the hydraulic brake 7 and the regenerative brake are being switched ("margin SOC amount"). That is, the HVECU 8 corrects the margin SOC amount to a low value on the basis of the future driving prediction. The corrected margin SOC amount is set to the SOC threshold value as an input restriction threshold value (margin SOC threshold value).

Figure 4:
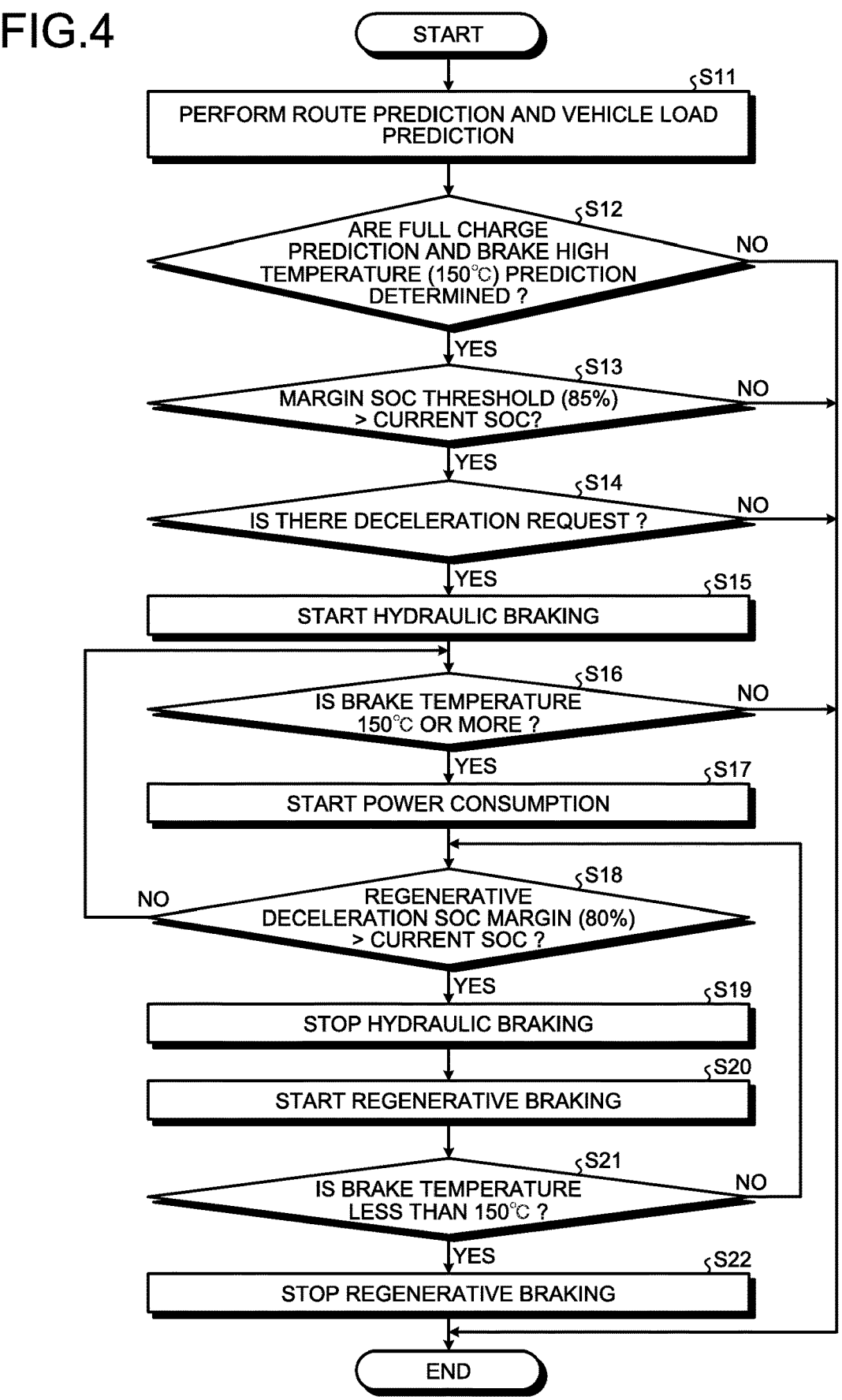
FIG. 4 is a flowchart illustrating a control flow of brake coordination control according to a second embodiment.

FIG. 4 is a flowchart illustrating a flow of the brake coordination control according to the second embodiment. The control flow illustrated in FIG. 4 is performed by the HVECU 8. Note that control routine illustrated in FIG. 4 is repeatedly executed while the vehicle 1 is traveling.

First, the HVECU 8 performs the future route prediction and the vehicle load prediction on the basis of the navigation system, the front camera, the altitude, and the outside air temperature (step S11). In step S11, the route prediction and the vehicle load prediction described above are performed.

The HVECU 8 predicts SOC behavior and brake temperature behavior on the basis of a result of the prediction in step S11, the current SOC, and the temperature of the brake rotor, and performs prediction determination of full charge and prediction determination of a brake high temperature (step S12). In step S12, it is determined whether it can be predicted that the battery 6 will be fully charged in the future and the temperature of the brake rotor exceeds 150° C., which is in a high temperature state, by the above-described SOC behavior prediction and the brake temperature rise prediction being performed. If a negative determination is made in step S12 (step S12: No), the control routine is terminated.

If the determination in step S12 is affirmative (step S12: Yes), the HVECU 8 determines whether the current SOC is less than 85%, which is the margin SOC threshold value (step S13). The margin SOC threshold value used in the determination in step S13 is the margin SOC amount described above, and also includes the margin SOC amount corrected on the basis of the future driving prediction described above. If the current SOC is equal to or greater than the margin SOC threshold value (step S13: No), the control routine is terminated.

If the current SOC is less than the margin SOC threshold value (step S13: Yes), the HVECU 8 determines whether there is a deceleration request from a driver (step S14). The processing in step S14 is similar to the processing in step S1 in FIG. 2. If there is no deceleration request from the driver (step S14: No), the control routine is terminated.

If there is a deceleration request from the driver (step S14: Yes), the HVECU 8 starts hydraulic braking (step S15). By the control in step S15 being performed, friction braking force based on the hydraulic brake 7 is generated.

During the hydraulic braking, the HVECU 8 determines whether the temperature of the brake rotor is equal to or higher than 150° C. (step S16). In step S16, high temperature determination is performed on the hydraulic brake 7 in the state where only the friction braking force is generated with respect to the required braking force. If the temperature of the brake rotor is less than 150° C. (step S16: No), the control routine is terminated.

If the temperature of the brake rotor is equal to or higher than 150° C. (step S16: Yes), the HVECU 8 performs control such that power consumption of an electric device is started (step S17). In step S17, the electric device consumes power while the hydraulic braking is continued.

The HVECU 8 determines whether the current SOC is less than a regenerative deceleration SOC margin (step S18). In step S18, for example, the regenerative deceleration SOC margin set at 80% is compared with the current SOC. If the current SOC is equal to or greater than the regenerative deceleration SOC margin (step S18: No), the control routine returns to step S16.

If the current SOC is less than the regenerative deceleration SOC margin (step S18: Yes), the HVECU 8 stops the hydraulic braking (step S19), and starts the regenerative braking (step S20). In step S19, the hydraulic brake 7 is released to set the friction braking force to zero. In step S20, the regenerative braking is performed to generate regenerative braking force.

Subsequently, during the regenerative braking, the HVECU 8 determines whether the temperature of the brake rotor is less than 150° C. (step S21). In step S21, the high temperature determination is performed on the hydraulic brake 7 in the state where only the regenerative brake is operating. If the temperature of the brake rotor is equal to or higher than 150° C. during the regenerative braking (step S21: No), the control routine returns to step S18.

If the temperature of the brake rotor is less than 150° C. during the regenerative braking (step S21: Yes), the HVECU 8 stops the regenerative braking (step S22). In step S22, the regenerative power generation based on a drive motor MG2 is stopped so that the regenerative braking force is made to zero. Upon execution of step S22, the control routine is terminated.

Figure 5:
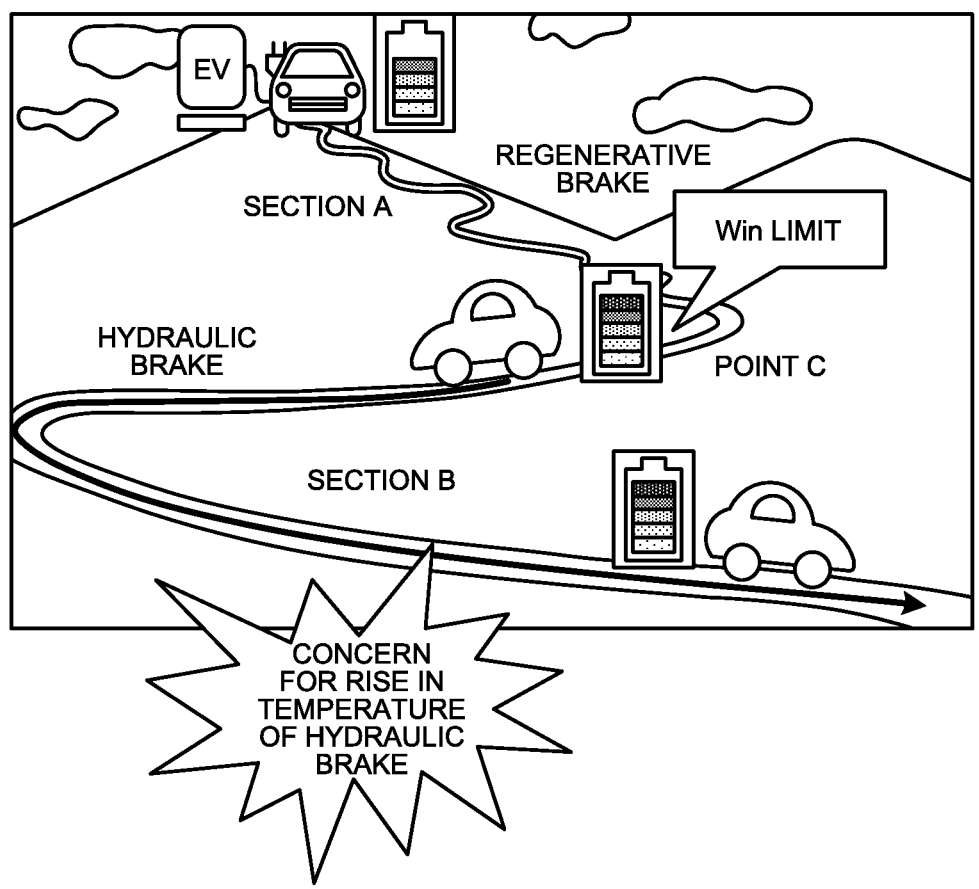
FIG. 5 is a drawing illustrating exemplary traveling in which a hydraulic brake enters a high temperature state when an input to a battery is restricted.

FIG. 5 is a diagram for illustrating exemplary traveling in which the hydraulic brake 7 enters a high temperature state when input to the battery 6 is restricted. As illustrated in FIG. 5, in the case of a route of traveling in which downhill roads continue, according to a configuration in a related art, a section A is traveled with the regenerative brake, and then the input restriction (Win limit) to the battery 6 is applied at a point C, for example, so that a section B is traveled in a decelerating manner using the hydraulic brake 7 thereafter, whereby the temperature of the brake rotor rises.

Meanwhile, with the brake control device according to the second embodiment, use of the hydraulic brake 7 is started at a point D (not illustrated in FIG. 5) before the point C, which is the point at which the input restriction (Win limit) is applied in a configuration in a related art, on the basis of the future driving prediction. Accordingly, a margin can be made for the SOC before the input restriction to the battery 6 is applied. It becomes thus possible to consume power of the battery 6 to make a margin to the SOC before the brake temperature rises and the brake rotor reaches a limit temperature. In addition, the SOC decreases due to the power consumption, whereby the regenerative brake can be used. The hydraulic brake 7 is temporarily stopped to start the regenerative brake, accordingly. As a result, a rise in temperature of the brake rotor can be suppressed.

Figure 6:
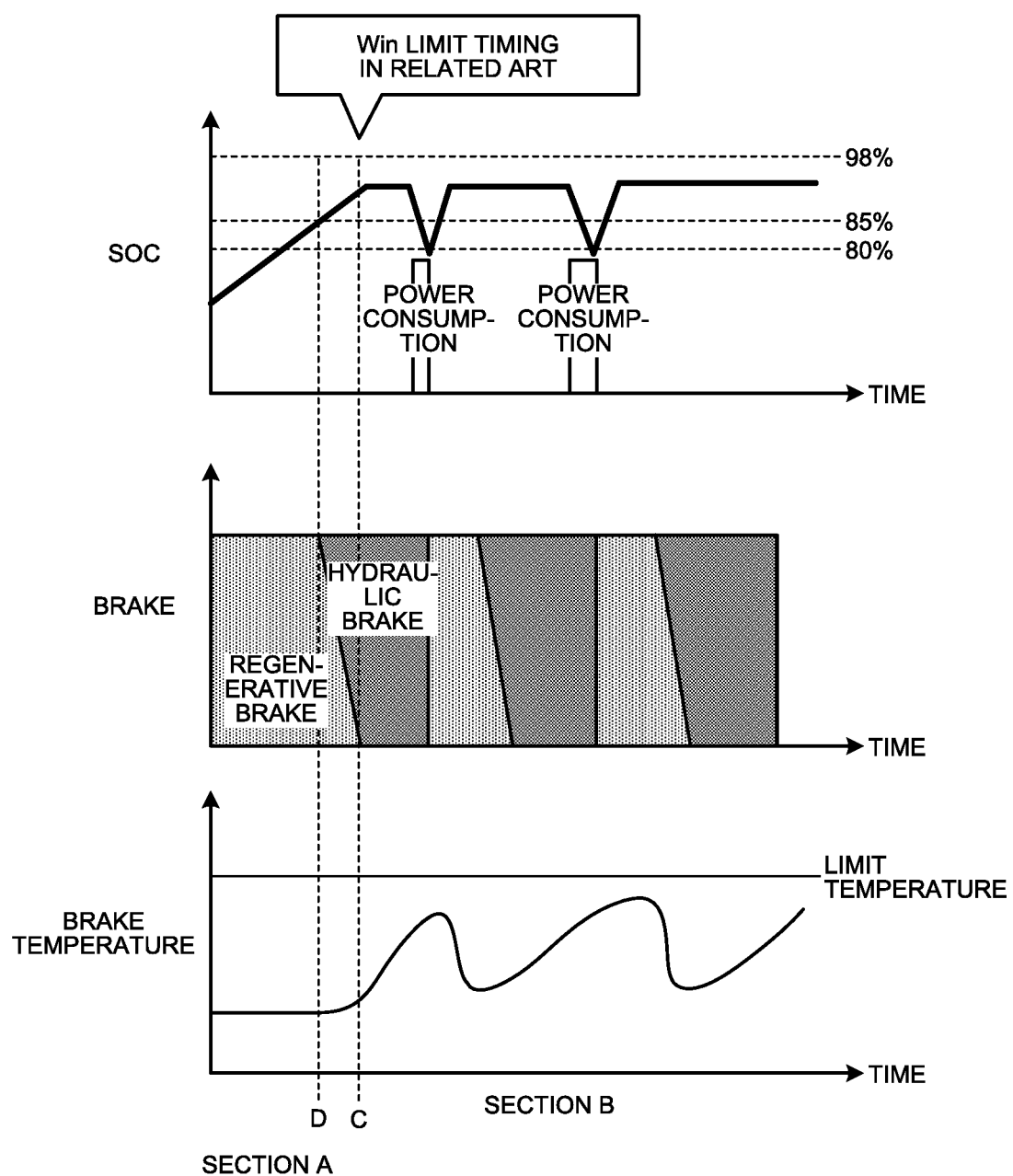
FIG. 6 is a time chart illustrating changes in a vehicle state when the brake coordination control according to the second embodiment is performed.

FIG. 6 is a time chart illustrating changes in a vehicle state when the brake coordination control according to the second embodiment is performed. Note that, in descriptions of FIG. 6, the section A, the section B, and the point C will be used from the above-described exemplary traveling illustrated in FIG. 5.

First, in the state where the SOC is lower than the margin SOC threshold value (85%), the regenerative braking force is generated only by the regenerative brake in response to the deceleration request. While the hydraulic brake 7 is not operated in this state so that the temperature of the hydraulic brake 7 does not rise, the SOC increases due to the regenerative power generation based on the regenerative brake. This corresponds to the decelerating traveling state in the section A illustrated in FIG. 4.

Then, when the SOC exceeds the margin SOC threshold value (85%), the regenerative brake is restricted and the hydraulic braking is started. The margin SOC threshold value is set to the margin SOC amount corrected to a value lower than that in the related art on the basis of the future driving prediction. Accordingly, in the second embodiment, the hydraulic braking is started at the point D before the point C at which the input restriction timing is set in the configuration in a related art. That is, the hydraulic brake 7 is operated at a timing earlier than that in the related art. Thereafter, although the route in which downhill roads continue is traveled in the section B, the coordination control of the regenerative brake and the hydraulic brake 7 described above is performed, whereby the temperature of the brake rotor can be suppressed from reaching the limit temperature.

In this manner, according to the second embodiment, in the case where the input restriction to the battery 6 is applied and long decelerating traveling is expected, use of the hydraulic brake 7 can be started in the state where the SOC has a margin. As a result, it becomes possible to generate, using the regenerative brake, the regenerative braking force for securing the required deceleration level when the temperature of the brake rotor rises, whereby the use of the hydraulic brake 7 is stopped and the rise in temperature of the brake rotor can be suppressed.

Note that a vehicle to which the brake control device according to each embodiment described above can be applied is not limited to a series hybrid automobile. For example, it may be a split hybrid automobile, an electric vehicle (EV) not equipped with an engine 2, a plug-in hybrid automobile, or a plug-in electric vehicle. Furthermore, when it is applied to an electric vehicle, the HVECU 8 described in the descriptions above may be simply read as an ECU.

According to the present disclosure, the braking force can be secured by the regenerative braking force based on the regenerative brake even when the friction braking force based on the hydraulic brake is reduced, thereby increasing opportunities for performing the regenerative braking. As a result, a frequency in use of the hydraulic brake can be reduced, and the rise in temperature of the brake rotor can be suppressed.

According to an embodiment, the power of the battery can be consumed to the extent that the regenerative braking can be performed even when the temperature of the brake rotor is high, whereby the regenerative braking force sufficient to secure necessary braking force can be generated. As a result, the friction braking force based on the hydraulic brake can be reduced, and a rise in the temperature of the brake rotor can be suppressed.

According to an embodiment, even when the friction braking force is restricted due to the rise in temperature of the brake rotor, the braking force can be secured by the regenerative braking force. As a result, opportunities for performing the regenerative braking increases, and a frequency in use of the hydraulic brake can be reduced, which leads to the improvement in endurance of the hydraulic brake.

According to an embodiment, the SOC as the input restriction threshold value is set to be low from the prediction result of the future vehicle load, whereby switching from the regenerative braking to the hydraulic braking can be carried out at an earlier timing than in the related art. As a result, by predicting the future vehicle load, the hydraulic brake and the regenerative brake are selectively used while the battery is predicted to be subject to input restriction, whereby the rise in temperature of the brake rotor can be suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A brake control device for a vehicle, comprising:
a motor connected to wheels;
a hydraulic brake that generates a friction braking force based on frictional contact with a brake rotor that integrally rotates with the wheels;
a controller that performs coordination control of regenerative brake control, in which a regenerative power generation is performed by the motor on a basis of rotation of the wheels to apply a regenerative braking force to the wheels, and hydraulic brake control, in which the hydraulic brake is operated; and
a battery that exchanges power with the motor, wherein
the controller is configured to, when a temperature of the brake rotor is higher than a predetermined temperature in a case where input to the battery is restricted in a state where there is the deceleration request, start power consumption of a electric device while the friction braking force is generated, and then, when a charge state of the battery enters a state having a margin for achieving a current required deceleration level with the regenerative braking force, stop the power consumption of the electric device, reduce the friction braking force, and start the regenerative braking control.

2. The brake control device for a vehicle according to claim 1, wherein
the controller is configured to, when power consumption of the electric device starts, continue to consume power of the battery using the electric device until a charge state of the battery enters a state having a margin for achieving a current required deceleration level with the regenerative braking force.

3. The brake control device for a vehicle according to claim 1, wherein
the controller is configured to:
predict a future route of the vehicle and predict a vehicle load when the vehicle travels on the predicted route, and
in a case where it is predicted from a result of the prediction that the temperature of the brake rotor becomes higher than the predetermined temperature when input to the battery is restricted, set a state of charge as an input restriction threshold value for carrying out a change from the regenerative braking control to the hydraulic brake control to be lower compared with a case where the temperature of the brake rotor is less than the predetermined temperature.

4. A brake control device for a vehicle, comprising:
a motor connected to wheels;
a hydraulic brake that generates a friction braking force based on frictional contact with a brake rotor that integrally rotates with the wheels;
a controller that performs coordination control of regenerative brake control, in which a regenerative power generation is performed by the motor on a basis of rotation of the wheels to apply a regenerative braking force to the wheels, and hydraulic brake control, in which the hydraulic brake is operated; and
a battery that exchanges power with the motor, wherein
the controller is configured to:
predict a future route of the vehicle and predict a vehicle load when the vehicle travels on the predicted route, and
in a case where it is predicted from a result of the prediction that a temperature of the brake rotor becomes higher than a predetermined temperature when input to the battery is restricted, set a state of charge as an input restriction threshold value for carrying out a change from the regenerative braking control to the hydraulic brake control to be lower compared with a case where the temperature of the brake rotor is less than the predetermined temperature.

5. The brake control device for a vehicle according to claim 4, wherein
the controller is configured to, when power consumption of the electric device starts,
continue to consume power of the battery using the electric device until a charge state of the battery enters a state having a margin for achieving a current required deceleration level with the regenerative braking force.

* * * * *